United States Patent
Wang et al.

(10) Patent No.: US 10,562,098 B2
(45) Date of Patent: Feb. 18, 2020

(54) HIGH THROUGHPUT MICRO-SYNTHESIS METHOD OF MULTI-COMPONENT MATERIALS

(71) Applicant: Central Iron and Steel Research Institute, Beijing (CN)

(72) Inventors: Haizhou Wang, Beijing (CN); Yunhai Jia, Beijing (CN); Lei Zhao, Beijing (CN); Xuebin Chen, Beijing (CN); Dongling Li, Beijing (CN); Peng Wang, Beijing (CN); Guang Feng, Beijing (CN); Xiaojia Li, Beijing (CN)

(73) Assignee: Central Iron and Steel Research Institute (CN)

( * ) Notice: Subject to any disclaimer, the term of this patent is extended or adjusted under 35 U.S.C. 154(b) by 0 days.

(21) Appl. No.: 15/912,930

(22) Filed: Mar. 6, 2018

(65) Prior Publication Data
US 2019/0111481 A1    Apr. 18, 2019

(30) Foreign Application Priority Data
Oct. 12, 2017    (CN) .......................... 2017 1 0946481

(51) Int. Cl.
*B22F 3/105*    (2006.01)
*B29C 35/08*    (2006.01)
(Continued)

(52) U.S. Cl.
CPC .............. *B22F 3/105* (2013.01); *B22D 27/02* (2013.01); *B22D 27/15* (2013.01); *B22F 3/003* (2013.01);
(Continued)

(58) Field of Classification Search
CPC .............. B22F 3/105; B22F 2003/0154; B22F 3/1007; B22F 3/1115; B22F 3/24;
(Continued)

(56) References Cited

U.S. PATENT DOCUMENTS 4,501,717 A  *  2/1985  Tsukamoto ............. C04B 35/64
                                                         419/56

FOREIGN PATENT DOCUMENTS

| CN | 104596235   | * | 5/2015  |
|----|-------------|---|---------|
| CN | 103204499   | * | 7/2015  |
| CN | 106191991 A |   | 12/2016 |

OTHER PUBLICATIONS

CN 103204499 Machine Translation (Year: 2015).*
CN 104596235 Machine Translation (Year: 2015).*
CN 106191991 Machine Translation (Year: 2016).*
Introduction to Material Genome Initiative, Chinese Journal of Nature, 2014, 36 (2): 89-104.
(Continued)

*Primary Examiner* — Tima M. McGuthry-Banks
(74) *Attorney, Agent, or Firm* — Katten Muchin Rosenman LLP

(57) ABSTRACT

The present invention belongs to the technical field of high throughput preparation and hot working of materials, and in particular to a high throughput micro-synthesis method of multi-component materials based on the temperature gradient field controlled by microwave energy. This invention, characterized by flexible material selection, quick temperature rising and high-efficient heating, uses microwave heating both to achieve quick preparation of small block combinatorial materials under the same temperature field in one time and to realize micro-synthesis under the different temperature gradient fields in one time including high-throughput sintering-melting and heat treatment of materials. This invention successfully overcomes drawbacks of current material preparation, such as unitary combination of components, low-efficient external heating, unique control temperature, huge material consumption and high cost during material preparation and heat treatment.

13 Claims, 4 Drawing Sheets

(51) Int. Cl.
  *B22D 27/02*   (2006.01)
  *B22F 3/00*    (2006.01)
  *B22F 3/10*    (2006.01)
  *B22D 27/15*   (2006.01)
  *C22F 1/10*    (2006.01)
  *B22F 3/11*    (2006.01)
  *B22F 3/24*    (2006.01)

(52) U.S. Cl.
  CPC .......... *B22F 3/1007* (2013.01); *B22F 3/1035* (2013.01); *B22F 3/1115* (2013.01); *B22F 3/24* (2013.01); *B29C 35/0805* (2013.01); *C22F 1/10* (2013.01); *B22F 2003/1054* (2013.01); *B22F 2003/248* (2013.01); *B22F 2201/20* (2013.01); *B22F 2304/10* (2013.01)

(58) Field of Classification Search
  CPC ............ B22F 2201/20; B22F 2003/248; B22F 3/003; B22F 3/1035; C30B 28/02; B22D 27/02; B22D 27/15; B29C 2305/0855; B29C 35/0805
  See application file for complete search history.

(56) References Cited

OTHER PUBLICATIONS

Peng Jinhui, Yang Xianwan: New Application of Microwave Energy [M]. Kunming: Yunnan Science and Technology Press, 1997: 75-78.
Wang Haizhou, Wang Hong, Ding Hong, Xiang Xiaodong, Xiang Yong, Zhang Xiaokun: Progress in high-throughput materials synthesis and characterization[J]. Science and Technology Review, 2015, 33 (10): 31-49.
Notification for Speeding up examination of patent application for Chinese Patent Application No. 2017109464819 dated Mar. 5, 2018.
First Notification of Examiner's Opinion for Chinese Patent Application No. 2017109464819 dated Mar. 26, 2018.
Second Notification of Examiner's Opinion for Chinese Patent Application No. 2017109464819 dated Jul. 2, 2018.
Notification for Go Through the Formalities of Registration for Chinese Patent Application No. 2017109464819 dated Jul. 25, 2018.
Notification for Grant Patent Right of Invention for Chinese Patent Application No. 2017109464819 dated Jul. 25, 2018.

* cited by examiner

HIGH THROUGHPUT MICRO-SYNTHESIS METHOD OF MULTI-COMPONENT MATERIALS

TECHNICAL FIELD

The present invention belongs to the technical field of high throughput preparation and hot working of materials, in particular to a high throughput micro-synthesis method of multi-component materials based on a temperature gradient field controlled by microwave energy. By utilizing the microwave energy field, under the same temperature field or different temperature gradient fields, small-sized block combinatorial material samples with multiple components can be rapidly synthesized in one time, and the small-sized flaky material samples can be subjected to heat treatment rapidly in batches.

BACKGROUND ART

Traditional research and development method of new materials can be concluded to a "trial and error method". In the trial and error method, firstly, based on the existing theories or experiences, the matching ratio of components of the target material is predicted or selected, and then the target material is subjected to such preparation and processing as melting, smelting and heat treatment etc. in small batches (ordinarily, dozens of kilograms of metal materials are required), and then the components are adjusted and optimized according to the characterization results of the prepared samples, preparation and characterization are conducted once again, and the materials satisfying requirements are finally obtained after repeated cycles. However, such a discrete sample preparation, trial and error method, in which only one sample is prepared in one experiment is low in efficiency and high in R&D cost. It is a worldwide statistic that it would spend about 5-12 years in average on R&D of a new material because of the low efficiency and high cost of R&D, which become a bottleneck of the development of modern new materials. (Introduction to Material Genome Initiative, Nature, 2014, 36 (2): 89-104).

The current material preparation method (especially the preparation technology of block materials) is generally used for a certain material system. It is low efficient and high costs because only one component ratio of sample could be prepared each time, which causes the following five major technical defects:

1. The component of the prepared material is single. The component of a material plays a leading role in the performance of the material. With the smelting preparation method of the metal material as an example, in the existing method, only one component combining mode can be selected once for blending and smelting, thereby greatly reducing the efficiency of determining the matching conditions of optimal component combination.

2. The efficiency of external heating during the preparation of materials is low. In traditional heating method, by utilizing external heat source, conductive heating is gradually performed from the outside to the inside via heat radiation, and the ambient temperature can only be raised to a set degree after a long time, moreover, the efficiency of temperature rise and heating homogenization of materials will also be influenced by size of material volume and such parameters as heat conductivity etc., therefore, the radiation heating manner is long in heating time and low in heating efficiency.

3. The controlling temperature during material preparation is unique. The control of temperature conditions is a key factor in the preparation of materials. If the temperature is too low, various components cannot be melted completely, then the components will produce nonuniform, agglomerated, mingled and defected phenomena etc.; if the temperature is too high, then it will result in that impurities are difficult to be removed and the energy consumption is increased. In the existing method, only one temperature can be selected during each preparation, that greatly reduces the efficiency of selecting the optimal preparation temperature conditions.

4. The controlling temperature of heat treatment of materials is single. The microstructure of materials plays a decisive role in material performance, materials with the same components can be converted into different microstructures and thus have different performances through heat treatment process under different temperatures. The existing method cannot realize heat treatment of a single material under various temperatures at the same time, which means that more microstructures cannot be obtained, leading to the difficulty in screening out the microstructure combination which has the greatest effect in improving the performance of materials, thereby greatly reducing the efficiency of exploring the process conditions of heat treatment.

5. The consumption of raw materials for preparing single sample is large, which leads to higher cost. In the R&D stage, the consumption of single sample is also very large in a certain degree when new materials are in trial production in small batches, for example, the weight of single metal materials in the trial production is often dozens of kilograms, and the repeated experiments are needed, which are also the main reasons of high R&D cost.

Microwave belongs to electromagnetic wave, and when it is interacted with objects, it can accelerate the movement of the microscopic particles in the object, and convert the electromagnetic energy of the microwave into heat energy, thereby realizing the heating of objects. Different from the heating of external radiation, microwave can heat both the outside and the inside of the samples at the same time. Microwave heating not only has the advantages of material selection characteristic, high temperature rise speed and high heating efficiency etc, but also can lower the reaction temperature, shorten the reaction time, promote energy saving and reduce material consumption; meanwhile, since microwave heating does not generate any gas, it is also a green and efficient heating method (Peng Jinhui, Yang Xianwan: New Application of Microwave Energy [M]. Kunming: Yunnan Science and Technology Press, 1997: 75-78.).

High throughput synthesis is an important part of Material Genome Initiative, and its task is to manufacture material microchips with hundreds of combinations in one time in a short time. Then different high throughput characterization methods are adopted to rapidly screen out the combination modes satisfying target requirements, and its core concept is to change the sequential iterative method adopted in traditional material research into parallel processing, and lead to a qualitative change of material research efficiency with quantitative changes (Wang Haizhou, Wang Hong, Ding Hong, Xiang Xiaodong, Xiang Yong, Zhang Xiaokun: Progress in high-throughput materials synthesis and characterization[J]. Science and Technology Review, 2015, 33 (10): 31-49). However, there's still no report on the adoption of microwave heating to obtain a controllable temperature gradient field and a high throughput synthesis method of materials.

SUMMARY OF THE INVENTION

In order to overcome the above drawbacks of the prior art, the objective of the present invention is to provide a high throughput micro-synthesis method based on multi-component materials of temperature gradient fields controlled by microwave energy. It based on the phenomenon that the metal powder particles and dielectric materials absorbing microwaves can be heated up to different temperatures under the action of the microwave energy field. So the same temperature distribution field or the different gradient temperature distribution field will be designed and generated, then small-sized block combinatorial samples with multiple components can be high-throughput synthesized in one time (the single sample is dozens of to hundreds of grams). The temperature fields with different temperature gradients can be formed under the control of the microwaves, thereby realizing high throughput synthesis in batches of small-sized samples and high throughput heat treatment in batches of small-sized flaky samples under different temperatures in one time.

In order to realize the above objective, the present invention provides the following technical solutions:

The present invention provides a high throughput micro-synthesis method of multi-component materials, and the method is high throughput sintering-melting preparation or heat treatment of materials in different temperature gradient fields or the same temperature field in one-time, including the following steps:

(1) Prepare raw materials

Prepare plenty of sample material with the same component or different components;

(2) Place the above raw materials with the same or different component combinations in the array crucibles, and then placing the array crucibles onto the carrier platform (4) inside the microwave cavity (1) of the microwave temperature-controlled heating furnace;

(3) Vacuumize the microwave cavity

Vacuumize the microwave cavity (1) via the vacuum extract opening (6) before heating; and (4) Load microwave energy to heat raw materials:

Use the microwave source generator (2) to heat each single crucible of the array to reach the designed temperature, so as to sinter and melt the sample materials or carry out heat treatment in the same or different temperature gradient fields;

Wherein the adjacent single crucibles in the array crucible are made of materials which can absorb the gradient changing microwave energy, or made of either materials which can absorb the identical microwave energy.

This is a method of high throughput sintering-melting preparation of materials in different temperature gradient fields or the same temperature field in one-time, and it comprises the following steps:

(a) Mix material powders

Weigh a series of matrix material powders of stipulated mass and the powders of to-be-added elements or components, then mix them uniformly according to a certain design proportional ratio to prepare the powder mixture 9 series with different component combinations;

(b) Fill the powder mixture 9 series with different component combinations into a honeycomb-shape array crucible 3, and then place the honeycomb array crucible 3 onto the carrier platform 4 in the microwave cavity 1 of the microwave temperature-controlled heating furnace;

(c) Vacuumize the microwave cavity

Vacuumize the microwave cavity 1 via a vacuum extract opening 6 before heating;

(d) Load microwave energy to heat powder materials

Use the microwave source generator 2 to heat each single cell crucible 8 in the honeycomb array crucible 3 to reach a design temperature, so as to sinter and melt the powder mixture 9 in a gradient temperature field or in a same temperature field;

Wherein the adjacent single cell crucibles 8 in the honeycomb array crucible 3 are made of either materials which can absorb the gradient changing microwave energy, or materials which can absorb the identical microwave energy.

In step (a), the particle size of the matrix material powder and the powder of the to-be-added elements or components is 1 nm-100 μm.

In step (b), the honeycomb array crucible 3 comprises a body of honeycomb array 7 made of materials penetrable by microwave and plenty of single cell crucibles 8 arranged in the body of honeycomb array 7. The plenty of single cell crucibles 8 are arranged in the shape of hexagon honeycomb array and adjacent to each other without contacting.

In step (c), the vacuum pressure is 0.01-1 Pa.

In step (c), the protective air is filled into the microwave cavity 1 through the inlet of protective air 5 after vacuumizing the microwave cavity in order to protect the microwave cavity 1 under the equilibrium protective air before being heated by microwave energy.

The protective air is selected from one of helium, neon, argon, krypton, xenon and nitrogen.

In step (d), firstly, a low-power microwave energy of 0-500 W is applied for 5±2 minutes via the microwave source generator 2, so the honeycomb array crucible 3 and the powder mixture 9 can be heated up moderately by fully absorbing the microwave energy. Secondly, a medium-power microwave energy of 501-2000 W is applied for 10±2 minutes in order to accelerate the absorption of microwave energy and heating-up of the honeycomb array crucible 3 and the powder mixture 9. Finally, a high-power microwave energy over 2000 W is applied for 30±2 minutes in order to heat the powder mixture into molten state moderately.

This is a method of high throughput heat treatment of materials in different temperature gradient fields in one-time, and it comprises the following steps:

(e) Prepare flaky material samples

Prepare or select flaky material samples 11 of uniform components or different components arranged discretely;

(f) Place the flaky material samples 11 inside the single heat treatment crucibles 10 in the high throughput gradient heat treatment array crucible, and then place the high throughput gradient heat treatment array crucible onto the carrier platform 4 inside the microwave cavity 1 of the microwave temperature-controlled heating furnace;

(g) Vacuumize the microwave cavity and the high throughput gradient heat treatment array crucible Vacuumize the microwave cavity 1 via a vacuum extract opening 6; then vacuumize the upper cover of heat treatment array 12 via the upper cover extract opening 19 and the body of heat treatment array 13 via the extract opening of heat treatment array body 16 respectively.

(h) Conduct gradient heat treatment on the samples:
Load the microwave energy to enable crucibles of the high throughput gradient heat treatment array to form a stable temperature gradient field which should be kept for a certain period for heat treatment until the flaky material samples form different metallographic microstructures in different temperature regions;
Wherein each adjacent single heat treatment crucible 10 in the high throughput gradient heat treatment array crucible is made of materials which can gradiently absorb the microwave energy.

In step (e), the size of the flaky material samples 11 conforms to the size of the single heat treatment crucible 10 in the high throughput gradient heat treatment array crucible; and the thickness of the flaky material samples 11 is 1-5 mm.

In step (f), the high throughput gradient heat treatment array crucible comprises an upper cover of heat treatment array 12 and a body of heat treatment array 13 both of which are made of microwave-penetrable and thermal insulation materials; plenty of single heat treatment crucibles 10 are arranged in the body of heat treatment array 13; there are many single heat treatment crucibles 10 arranged in the body of heat treatment array 13, these single heat treatment crucibles 10 are arranged adjacently in the shape of square but they do not contact with each other; The protruding ends 14, which correspond with the single heat treatment crucibles 10 one-to-one, are embedded on the bottom surface of the upper cover of heat treatment array 12. The size of the protruding ends 14 coincides with the single heat treatment crucibles 10 so that the protruding ends 14 can be entirely inserted into the single heat treatment crucibles 10. This design makes the flaky material samples 11 airtight inside the single heat treatment crucibles 10 when the upper cover of heat treatment array 12 covers on the body of heat treatment array 13; the single heat treatment crucibles 10 and the protruding ends 14 of the upper cover of heat treatment array 12 are made of different materials of which the ability to absorb microwave energy is different. And both corresponding groups of the single heat treatment crucibles 10 in the body of heat treatment array 13 and the protruding ends 14 in the upper cover of heat treatment array 12 are made of the same materials of which the abilities to absorb the microwave energy are identical.

In step (g), the vacuum pressure is 0.01-1 Pa.

In step (h), firstly, the high-power microwave energy greater than 2000 W is directly applied by the microwave source generator 2 for 10±2 minutes. Then keep the certain temperature for the required time according to the different materials after the temperature of high throughput gradient heat treatment array crucible reaches equilibrium degree. Finally, switch off the microwave source generator 2 and fill the cooling air into the upper cover of heat treatment array 12 and the body of heat treatment array 13 with the certain flow rate which depends on the required different cooling rate of material, so as to control the cooling rate of the single heat treatment crucibles 10 and the protruding ends 14.

Compared with the prior art, the present invention has the following beneficial effects:

1. The prepared material samples have features of multiple components. In the present invention, it is available to prepare many samples with different combinations of multiple components in one time, thereby greatly improving the efficiency of screening the matching conditions of optimal component combinations;
2. The heating efficiency of synchronously heating both outside and inside of samples is high. In the present invention, microwave is utilized to generate heat inside the materials to directly heat the materials, and substances which have a strong absorption capability of microwaves can be utilized to manufacture crucibles, and it raises the temperature under the action of a microwave field and assists in heating materials, therefore, simultaneous heating of the two manners can greatly improve the heating efficiency of materials;
3. The controlling temperature of material preparation has multiple temperature gradient fields. In the present invention, different microwave absorbing substances are adopted to prepare different crucibles which form a multiple-temperature-field array, and under the action of a microwaves energy, the crucibles on the same array can be heated up to different temperatures simultaneously which forms the miniature heating furnaces with multiple temperature gradients, thereby realizing simultaneous heating of materials at multiple temperatures in one time, and greatly improving the efficiency of selecting the optimal preparation temperature conditions;
4. The controlling temperature of material heat treatment has multiple temperature gradient fields. In the present invention, different microwave absorbing materials are adopted to prepare multiple temperature field heat treatment arrays, and under the action of microwaves, a miniature heating field with multiple temperature gradients can be simultaneously generated on the same array, thereby realizing simultaneous heat treatment of multiple materials under multiple temperature conditions, obtaining multiple metallographic microstructures on one or more kinds of materials in one time, and greatly improving the efficiency of selecting the optimal heat treatment process conditions.
5. The consumption of raw materials for preparing single sample is small. For the metal samples synthesized in batches in the present invention, the single size is small (several centimeters), and the quality is small (dozens of to hundreds of grams), therefore, the consumption of raw materials is small, the metal samples of such size can not only truly reflect various performances of the structural materials, but also save a large amount of costs, and the consumption of raw materials is at least 100 times lower than the that of traditional experiment-level trial-produced raw materials.

DESCRIPTION OF FIGURES

FIG. 2a 3D structural diagram of a honeycomb array crucible 3 of gradient temperature field;

FIG. 3a 3D structural diagram of a honeycomb array crucible 3 of the same temperature field;

FIG. 4a 3D structural diagram of a high throughput gradient temperature heat treatment array crucible;

Figure 1:
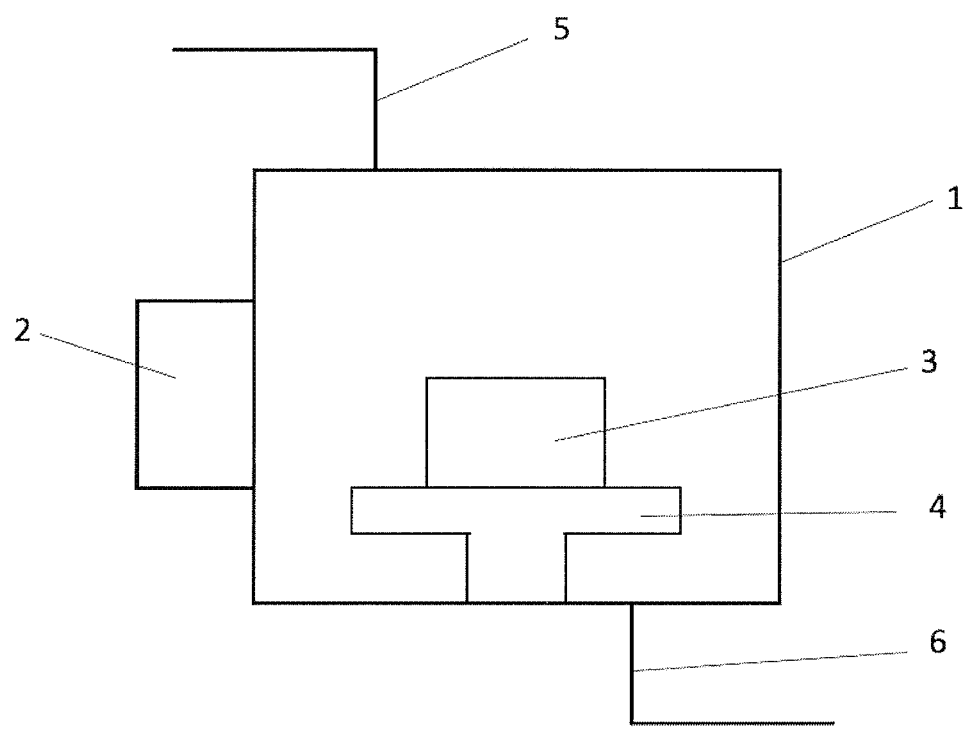
FIG. 1 Structural diagram of Microwave temperature-controlled Heating Furnace.

| Reference numerals in the figures: | |
|---|---|
| 1 microwave cavity | 2 microwave source generator |
| 3 honeycomb array crucible | 4 carrier platform |
| 5 inlet of protective air | 6 vacuum extract opening |
| 7 body of honeycomb array | 8 single cell crucible |
| 9 powder mixture | 10 single heat treatment crucible |
| 11 flaky material sample | 12 upper cover of heat treatment array |
| 13 body of heat treatment array | 14 protruding end |
| 15 air inlet of heat treatment array body | 16 extract opening of heat treatment array body |
| 17 extract opening of honeycomb array body | 18 air inlet of upper cover of heat treatment array |
| 19 extract opening of upper cover of heat treatment array | |

DETAILED DESCRIPTION OF THE EMBODIMENTS

Reference numerals in the figures: The present invention will be further described below in combination with the embodiments.

Reference numerals in the figures: A high throughput micro-synthesis method of multi-component materials based on the temperature gradient field controlled by microwave energy includes high throughput preparation of materials and/or high throughput heat treatment of materials.

I. High Throughput Synthesis of Materials (1) Mix Material Powders:

Weigh a series of matrix material powders of stipulated mass and the powders of to-be-added elements or components, (the diameter of the particles is about 1 nm-100 μm), then mix them uniformly according to a certain design proportional ratio to prepare the powder mixture 9 series with different component combinations;

Selection of particle size of metal powder: the penetration depth of the microwave to the metal powder can be represented by the skin depth δ acted on the metal by the microwave, and δ can be calculated through the following formula: $\delta = 0.029\sqrt{\rho\lambda}$ (in the formula, ρ is the resistivity of metal powder, while λ is the wavelength of the microwave), e.g., when metal tin powder is selected, the resistivity ρ under room temperature is $11.3 \times 10^{-8} \Omega \cdot m$, the wavelength λ is 0.12m when a microwave of 2450 MHz is used, then the depth δ that the microwave acts on the metal tin powder is 3.377 μm, that is to say, the most suitable particle diameter selected is about 6.754 μm (2δ); although the metal powder with the smallest particle size has a better microwave effect, the cost is also higher, therefore, under the action of 2450 MHz microwave energy field, for metal tin, it will be economic and suitable if the powder particle size is selected to be 10-100 μm, and preferably 10 μm.

(2) Fill the powder mixture 9 series with different component combinations into a honeycomb-shape array crucible 3, and then place the honeycomb array crucible 3 onto the carrier platform 4 in the microwave cavity 1 of the microwave temperature-controlled heating furnace;(as shown in FIG. 1);

As shown in FIG. 2a to FIG. 3b, the honeycomb array crucible 3 includes a body of honeycomb array 7 made from microwave penetrable materials and multiple single cell crucibles 8 arranged in the body of honeycomb array 7.

Multiple single cell crucibles 8 are adjacent to but not contacting with each other to form a honeycomb array of a regular hexagon shape.

The body of honeycomb array 7 is of a hollow or solid structure, to respectively prevent or promote the heat conduction between adjacent single cell crucibles 8.

The shape of the single cell crucible 8 is a square prisms, cylinder or hexagonal prisms.

Preferably, the number of the single cell crucibles 8 is three on each side of the honeycomb array with the shape of regular hexagon.

Preferably, the cross section of the honeycomb array crucible 3 is a shape of circular or regular hexogen.

Preferably, the external surface of the single cell crucible 8 is coated with an anti-heat radiation coating.

Adjacent single cell crucibles 8 are made of materials which absorb the microwave energy with gradient change, or made of materials which can absorb the microwave energy identically.

Figure 2A:
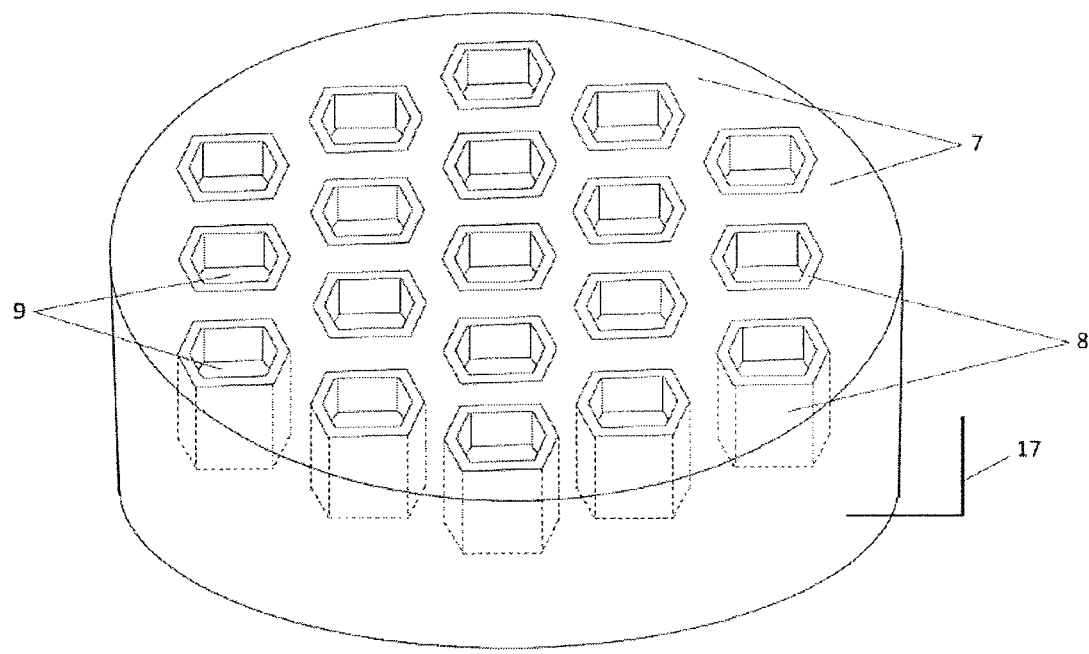
Figure 2B:
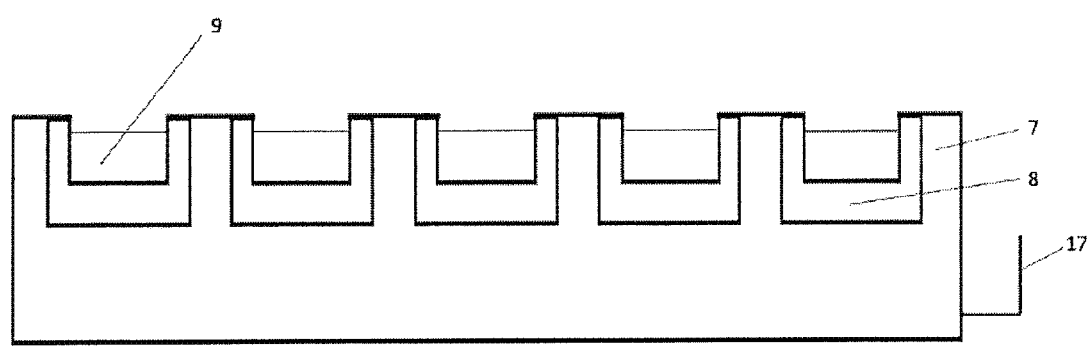
FIG. 2b Side view of a honeycomb array crucible 3 of gradient temperature field.

As shown in FIG. 2a and FIG. 2b, plenty of single cell crucibles 8 made of materials which absorb the microwave energy with gradient change constitute a honeycomb array crucible 3 of a gradient temperature field, the upper edge of the single cell crucible 8 is on the same horizontal plane as the upper surface of the body of honeycomb array 7, thereby ensuring that all the microwaves penetrating through the body of honeycomb array 7 act on the single cell crucibles 8 to heat up the single cell crucibles 8. And the anti-heat radiation coating on the external surface of the single cell crucibles 8 can prevent radiative heat transferring between single cell crucibles 8. The interval between the single cell crucibles 8 is 5-15 mm, and preferably 10 mm. The height of the single cell crucible 8 is 20%-50% of the height of the body of honeycomb array 7. The body of honeycomb array 7 is of a hollow structure, the body of honeycomb array 7 can be vacuumized via an extract opening of honeycomb array body 17, thereby preventing heat conduction between adjacent single cell crucibles 8, the ability of absorbing microwaves of each single cell crucible 8 is different, the single cell crucibles 8 can be heated to different temperatures, thereby realizing that the powder mixture 9 placed in different single cell crucibles 8 are synthesized via heating in different temperature fields; more preferably, the extract opening of honeycomb array body 17 on the body of honeycomb array 7 is used for vacuumizing the body of honeycomb array 7, and the pressure is in a range of 0.01-1 Pa.

Figure 3A:
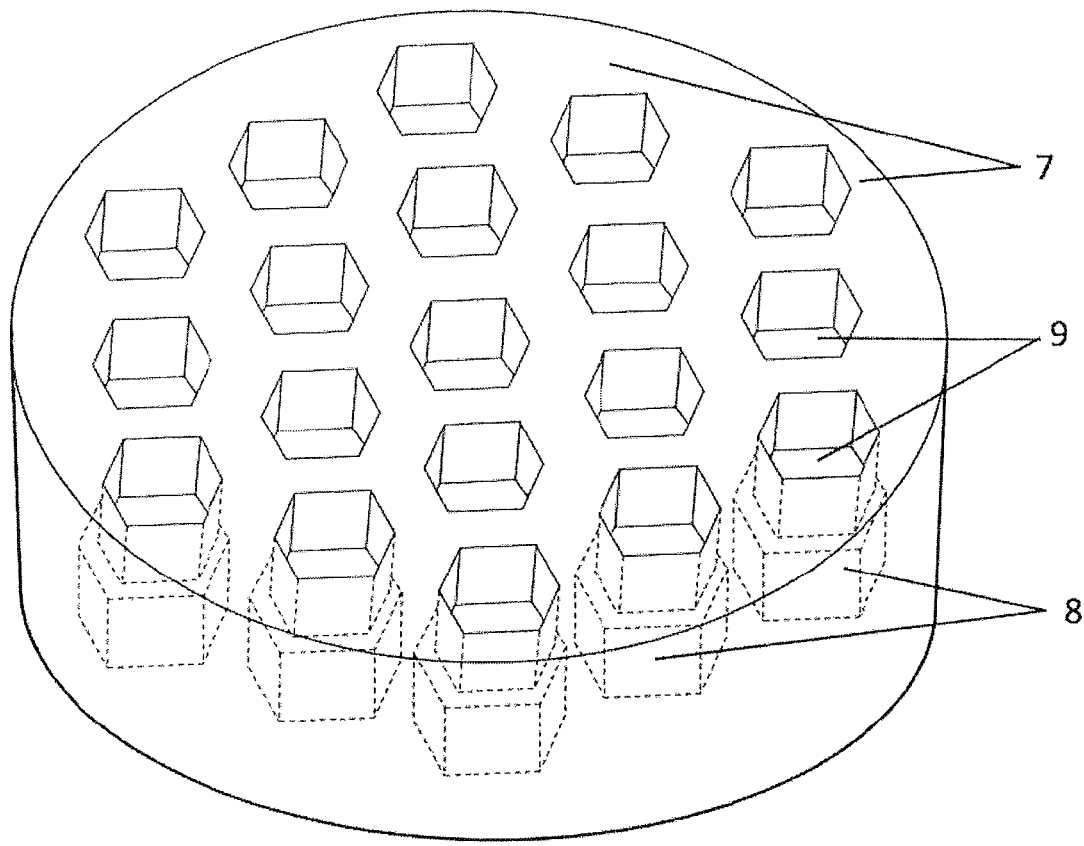
Figure 3B:
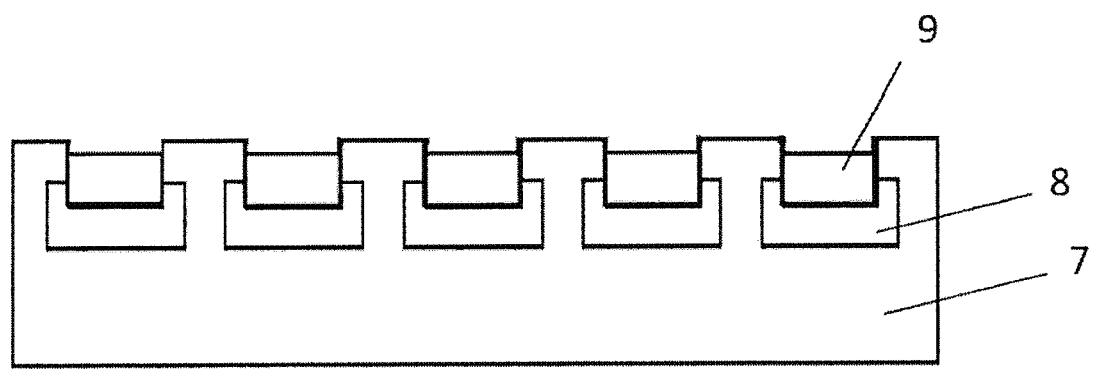
FIG. 3b Side view of a honeycomb array crucible 3 of the same temperature field.

As shown in FIG. 3a and FIG. 3b, plenty of single cell crucibles 8 made of materials which absorb the microwave energy identically constitute a honeycomb array crucible 3 of the same temperature field, the entire bodies of single cell crucibles 8 are inside the body of honeycomb array 7, thereby ensuring that a part of the microwaves penetrating through the body of honeycomb array 7 act on the single cell crucibles 8 to heat up the single cell crucibles 8 in order to realize external heating of the powder material. Then the other part of the microwaves directly act on the powder materials in the single cell crucible 8 in order to realize internal heating of the powder material. And there is no anti-heat radiation coating arranged on the external surface of the single cell crucibles 8, so as to improve the effect of temperature balancing of the honeycomb array crucible 3. The height of the single cell crucible 8 is 20%-50% of the height of the body of honeycomb array 7, and the distance from the upper edge of the single cell crucible 8 to the upper surface of the body of honeycomb array 7 is 20-50 mm, and preferably 25 mm. The body of honeycomb array 7 is of a solid structure, thereby promoting the heat conduction between adjacent single cell crucibles 8. The ability of absorbing microwaves of each single cell crucible 8 is the same, and each single cell crucible 8 is heated up to the same temperature to realize that the powder mixture 9 placed in different single cell crucibles 8 are prepared via heating in the same temperature field.

The present invention preferably adopts a regular hexagon single cell crucible 8, and its design is based on the two concepts, one is to use the minimum consumption of materials to make the maximum space of crucible array, the other is to benefit the flowing of liquid molten metal in the crucible. It will affect the homogenization of materials for the four right angles of the square crucible are not beneficial for the flow of the liquid in the crucible, and the square crucible will waste more crucible materials than the regular hexogen crucible; although a cylinder crucible is beneficial for the flow of liquid, the consumption, the cost and the useless space of cylinder crucible are more than that of square prisms and hexagonal prisms crucible, which leads to fewer space of the cylinder crucible for accommodating powder samples.

(3) Vacuumize the Microwave Cavity 1

In order to prevent the powder mixture 9 from being oxidized during heating, the microwave cavity 1 should be vacuumized via a vacuum extract opening 6 before heating, and the pressure is in a range of 0.01-1 Pa; or after vacuumizing, the microwave cavity 1 should be protected by a balanced protective air introduced via the inlet of protective air 5;

(4) Load the Microwave Energy Field to Heat Up the Powder Mixture

In order to avoid a discharging effect, firstly, a low-power microwave energy of 0-500 W is applied for 5±2 minutes via the microwave source generator 2, so the honeycomb array crucible 3 and the powder mixture 9 can be heated up moderately by fully absorbing the microwave energy. Secondly, a medium-power microwave energy of 501-2000 W is applied for 10±2 minutes in order to accelerate the absorption of microwave energy and heating-up of the honeycomb array crucible 3 and the powder mixture 9. Finally, a high-power microwave energy over 2000 W is applied for 30±2 minutes, so that each single cell crucible in the honeycomb array crucible 3 reaches the design temperature, and the powder mixture 9 therein should be heated up for sintering-melting preparation at a rated temperature;

(5) Cool Down and Post Process of Samples

Switch off the microwave source generator 2 after finishing the heat sintering of material samples, take out the samples after those being cooled down, and prepare the surface of block materials to be flat for following characterizations.

II. High Throughput Heat Treatment of Materials (1) Prepare Flaky Material Samples:

Prepare or select flaky material samples 11, the size of the flaky material samples 11 should conform to the size requirement of the single heat treatment crucible 10 in the high throughput gradient heat treatment array crucible, ensure that the flaky material samples can be placed in the single heat treatment crucibles 10 and its thickness should be 1-5 mm to guarantee the heat treatment effect.

Figure 4A:
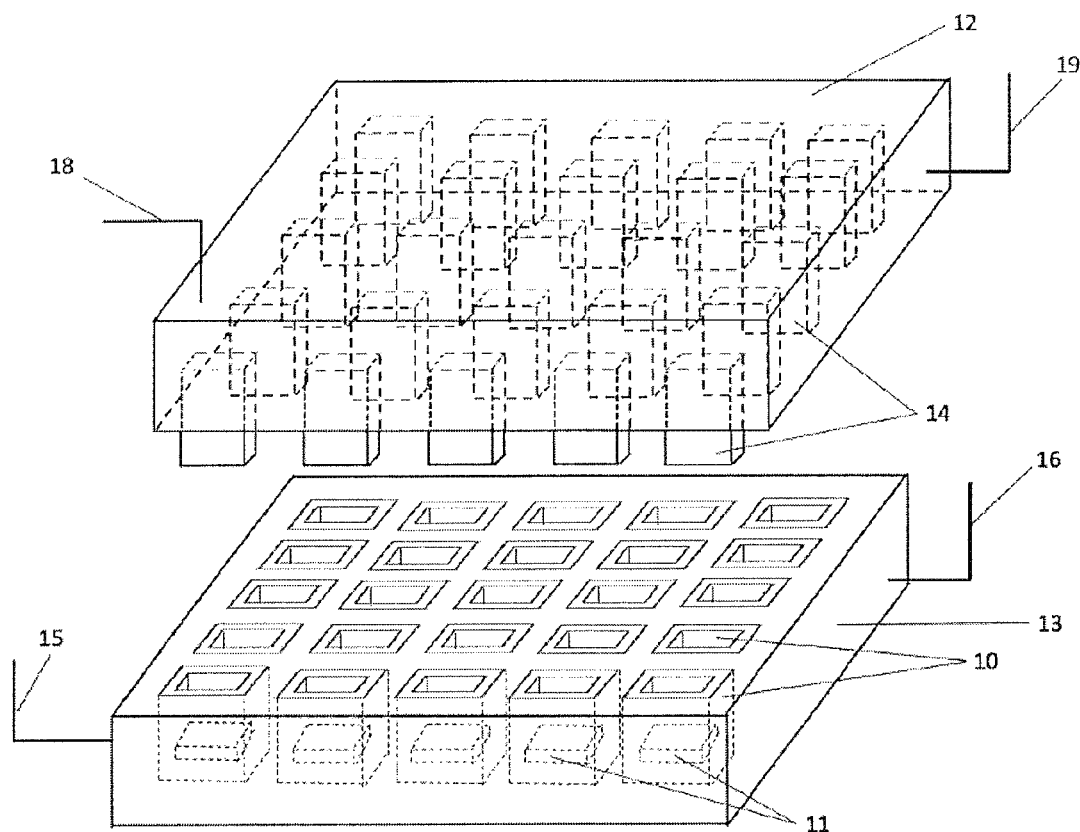
Figure 4B:
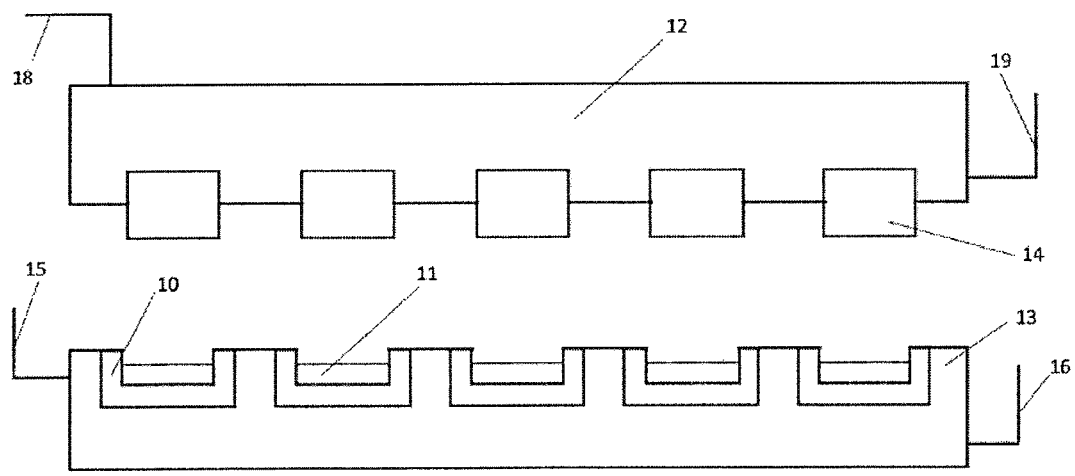
FIG. 4b Side view of a high throughput gradient temperature heat treatment array crucible.

As shown in FIG. 4a and FIG. 4b, the high throughput gradient heat treatment array crucible includes an upper cover of heat treatment array 12 and a body of heat treatment array 13 which are made of microwave-transparent and thermal insulation materials.

Plenty of single heat treatment crucibles 10 are arranged in the body of heat treatment array 13, plenty of single heat treatment crucibles 10 are adjacent to but not contacted with each other to form square heat treatment array; and the cross section of the single treatment crucible 10 is square. The upper edge of the single heat treatment crucible 10 is on the same horizontal plane as the upper surface of the body of heat treatment array 13. The height of the single heat treatment crucible 10 is 30%-50% of the height of the body of heat treatment array 13.

The protruding ends 14, which correspond with the single heat treatment crucibles 10 one-to-one, are embedded on the bottom surface of the upper cover of heat treatment array 12. The size of the protruding ends 14 coincides with the single heat treatment crucibles 10 so that the protruding ends 14 can be entirely inserted into the single heat treatment crucibles 10. This design makes the flaky material samples 11 airtight inside the single heat treatment crucibles 10 when the upper cover of heat treatment array 12 covers on the body of heat treatment array 13.

Both the external surface of the single heat treatment crucible 10 and the part of surface of the protruding ends 14 embedded into the upper cover of heat treatment array 12 are coated with anti-heat radiation coatings.

The upper cover of heat treatment array 12 and the body of heat treatment array 13 are both of a hollow structure, so as to prevent heat conduction among adjacent single heat treatment crucibles 10. The upper cover of heat treatment array 12 is installed an air inlet of upper cover of heat treatment array 18 and the body of heat treatment array 13 is installed an air inlet of heat treatment array body 15 which are used to inflate the cooling air into the upper cover of heat treatment array 12 and the body of heat treatment array 13 respectively. The upper cover of heat treatment array 12 is installed an extract opening of upper cover of heat treatment array 19 and the body of heat treatment array 13 is installed an extract opening of heat treatment array body 16 which are used to vacuumize or exhaust cooling air.

Preferably, the number of the single heat treatment crucibles 10 on each edge of the square heat treatment array is five.

The single heat treatment crucibles 10 and the protruding ends 14 of the upper cover of heat treatment array 12 are made of different materials of which the ability to absorb microwave energy is different. And both corresponding groups of the single heat treatment crucibles 10 in the body of heat treatment array 13 and the protruding ends 14 in the upper cover of heat treatment array 12 are made of the same materials of which the abilities to absorb the microwave energy are identical. The single heat treatment crucibles 10 are arranged in the sequence of different temperatures that the single heat treatment crucibles 10 can reach to form the heat treatment array.

The surfaces of the single heat treatment crucibles 10 and the protruding ends 14 of the upper cover of heat treatment array 12 are subjected to flat processing.

(2) Place the flaky material samples 11 in single heat treatment crucibles 10, cover the upper cover of heat treatment array 12, then put the high throughput gradient heat treatment array into the microwave temperature-controlled heating furnace and place it on the carrier platform 4 in the microwave cavity 1;

(3) Vacuumize the Microwave Cavity 1 and the Inside of the Heat Treatment Array In order to prevent oxidation of the flaky material samples 11, vacuumize the microwave cavity 1; in order to isolate the mutual heat conduction of the single heat treatment crucibles 10, vacuumize the upper cover of heat treatment array 12 and the body of heat treatment array 13 respectively; and the vacuum pressure range is 0.01-1 Pa.

(4) Conduct Gradient Heat Treatment on the Samples

Load the microwave energy to enable crucibles of the high throughput gradient heat treatment array to form a stable temperature gradient field which should be kept for a certain period for heat treatment until the flaky material samples 11 form different metallographic microstructures in different temperature regions;

Firstly, the high-power microwave energy greater than 2000 W is directly applied by the microwave source generator 2 for 10±2 minutes. Then keep the certain temperature for the required time according to the different materials after the temperature of high throughput gradient heat treatment array crucible reaches equilibrium degree. Finally, switch off the microwave source generator 2 and fill the cooling air into the upper cover of heat treatment array 12 and the body of heat treatment array 13 with the certain flow rate which depends on the required different cooling rate of material, so as to control the cooling rate of the single heat treatment crucibles 10 and the protruding ends 14. Finally, realize kinds of heat treatment such as annealing, normalizing, quenching, tempering and so on.

(5) Cool Down and Post Process of Samples

At end of heat treatment, take out the samples after being cooled down, then the combinatorial materials with the distribution of multiple microstructures should be formed. And polish the surface of combinatorial materials for the following characterization.

Embodiments

The embodiments of the present invention will be described in detail below in combination with the accompanying drawings.

1. High Throughput Synthesis of Small-Sized Alloy Samples with Components Gradient Distribution Under the Same Temperature Field 1) Weigh 11 parts of 100 g H13 alloy powder (none of cobalt component and the particle size of 25 μm-35 μm) as the matrix material, and then weigh 10 parts of pure cobalt metal powder of which the mass changes in a certain gradient, mix the pure cobalt metal powder with 10 parts of H13 alloy powder respectively and uniformly, so as to prepare 11 series of powder mixture 9 with the content of cobalt gradient changing from 0-10% approximately;

2) Fill 11 parts of powder mixture 9 into the honeycomb array crucible 3 with the same temperature field respectively. Each single cell crucible 8 in the honeycomb array crucible 3 is made of materials of which the abilities of absorbing microwave energy are identical.

3) Place the honeycomb array crucible 3 on the carrier platform 4 in the microwave cavity 1, close and seal the microwave cavity 1 in order to prevent the powder mixture from being oxidized by atmosphere during heating, vacuumize the microwave cavity 1 via the vacuum extract opening 6 until the pressure in the microwave cavity 1 is 0.01 Pa before heating, and then inflate the high-purity argon via the inlet of protective air 5 to protect the cavity by the balanced argon;

4) Load the microwave energy field through the microwave energy generator 2, while the honeycomb array crucible 3 with the same temperature field being acted in the microwave field, on the one hand, the microwave directly heats the inside of the powder mixture 9 to raise its temperature; on the other hand, each single cell crucible 8, which has the same ability of absorbing the microwaves, can be heated to the same temperature by the microwaves, so as to realize external auxiliary heating of the powder mixture 9 in the single cell crucible 8, that improve the efficiency of heating and melting the powder mixture 9, therefore, the inside and outside of the powder mixture 9 placed in the honeycomb array crucible 3 of the same temperature field are heated and melted simultaneously in the same temperature field.

5) Switched off the microwave source generator 2 after completing hot melting and synthesis of samples, take out the honeycomb array crucible 3 after cooling down the samples, and prepare the surfaces of 11 block samples containing different cobalt contents respectively to be flat for following characterizations.

2. High Throughput Synthesis of Small-Sized Alloy Samples with Different Components in Different Temperature Fields Since different materials have different melting points, this method is used for high throughput synthesis of small-sized alloy samples with different components and different melting points in one time.

1) Weigh 5 parts of 100 g H13 alloy powder (with the content of manganese being about 0.5% and the particle size of 25 μm-35 μm) as the matrix material, and then weigh 4 parts of pure manganese metal powder of which the mass changes in a certain gradient, mix the pure manganese metal powder with the H13 alloy powder respectively and uniformly, so as to prepare 5 series of powder mixture 9 with the content of manganese gradient changing from 0.5-5% approximately;

2) Weigh 5 parts of 100 g pure copper metal powder (with the particle size of 25 μm-35 μm) as the matrix material, and then weigh 4 parts of pure zinc metal powder of which the mass changes in a certain gradient, mix the pure zinc metal powder with the pure copper metal powder respectively and uniformly, so as to prepare 5 series of powder mixture 9 with the content of zinc gradient changing from 0-5% approximately;

3) Weigh 5 parts of 100 g pure tin metal powder (with the particle size of 25 μm-35 μm) as the matrix material, and then weigh 4 parts of pure copper metal powder of which the mass changes in a certain gradient, mix the pure copper metal powder with the pure tin metal powder respectively and uniformly, so as to prepare 5 series of powder mixture 9 with the content of tin gradient changing from 0-5% approximately;

4) Fill 15 parts of powder mixture 9 into the honeycomb array crucible 3 with the gradient temperature field respectively. Each single cell crucible 8 in the honeycomb array crucible 3 is made of materials of which the abilities of absorbing microwave energy are different, and the outside surface of single cell crucible 8 is coated with anti-heat radiation coating. The body of honeycomb array 7 is of a hollow structure, thereby preventing mutual heat conduction between adjacent single cell crucibles 8;

5) Place the honeycomb array crucible 3 on the carrier platform 4 in the microwave cavity 1, close and seal the microwave cavity 1 in order to prevent the powder mixture 9 from being oxidized by atmosphere during heating, vacuumize the microwave cavity 1 via the vacuum extract opening 6 until the pressure in the microwave cavity 1 is 0.01 Pa before heating, and then inflate the high-purity argon via the inlet of protective air 5 to protect the cavity by the balanced argon, and then vacuumize the body of honeycomb array 7 via the extract opening of honeycomb array body 17 until the pressure in the body of honeycomb array 7 is 0.01 Pa;

6) Load the microwave energy field through the microwave energy generator 2, while the honeycomb array crucible 3 being acted in the microwave field, on the one hand, the microwave directly heats the inside of the powder mixture 9 to raise its temperature; on the other hand, each single cell crucible 8 is heated to different temperatures after they absorb the microwaves to assist the powder mixtures 9 with different melting points in performing external heating and melting in different temperature gradient fields, that improve the efficiency of heating and melting the powder mixture 9, therefore, the inside and outside of the powder mixture 9 placed in the honeycomb array crucible 3 are heated and melted simultaneously in different temperature gradient fields.

7) Switched off the microwave source generator 2 after completing hot melting of the samples, take out the honeycomb array crucible 3 after cooling down the samples, and prepare the surfaces of 15 different block samples of materials to be flat for following characterizations.

3. High Throughput Gradient Heat Treatment of Small-Sized Flaky Metal Materials

1) Prepare the alloy sample to a flaky material sample 11 with the cross section being 2×2cm and the thickness being 3 mm, so as to ensure the effect of heat treatment and save the cost of raw materials; put the flaky material samples 11 into the single heat treatment crucibles 10 respectively, and close the upper cover of heat treatment array 12 to keep the flaky material samples 11 being in an airtight state;

2) Place the high throughput gradient heat treatment array crucible with an upper-lower structure on the carrier platform 4 in the microwave cavity 1, close and seal the microwave cavity 1 in order to prevent the flaky material samples 11 from being oxidized by atmosphere while the flaky material samples 11 being heated, and vacuumize the microwave cavity 1 via the vacuum extract opening 6 until the pressure in the microwave cavity 1 is 0.01 Pa;

3) Vacuumize the inside of the upper cover of heat treatment array 12 via the upper cover extract opening 19 and the body of heat treatment array 13 via extract opening of heat treatment array body 16 respectively in order to isolate mutual heat conduction among single heat treatment crucibles 10, the pressure in the upper cover of heat treatment array 12 and the body of heat treatment array 13 is 0.01 Pa;

4) Load high-power microwave energy greater than 2000 W directly for about 10 minutes via the microwave source generator 2, enable the single heat treatment crucibles 10 of the high throughput gradient heat treatment array crucible and the corresponding protruding ends 14 to respectively reach the highest rated temperatures, thereby forming a temperature gradient field, then preserve the temperatures for 30 minutes to enable different flaky material samples 11 to form different metallography microstructures;

5) Switched off the microwave source generator 2, fill the cooling air into the upper cover of heat treatment array 12 and the body of heat treatment array 13 respectively via the air inlet of upper cover of heat treatment array 18 and the air inlet of heat treatment array body 15, and the cooling air will flow out via the extract opening of upper cover of heat treatment array 19 of the heat treatment array and the extract opening of heat treatment array body 16 of the heat treatment array, control the air flow rate at 10 L/min to cool down the temperatures of the single heat treatment crucibles 10 and the protruding ends 14 and realize the annealing heat treatment.

6) Take out the samples and polish their surfaces for the following analysis of metallographic microstructure after the samples are cooled down to the room temperature.

What is claimed is:

1. A high throughput micro-synthesis method of multi-component metal materials, wherein the method comprises high throughput sintering-melting preparation or heat treatment of materials in different temperature gradient fields or the same temperature field in one-time, comprises the following steps:
    (1) preparing raw materials by preparing plural sample metal materials with a same component or different components;
    (2) placing the above sample materials with the same or different components in array crucibles, and then placing the array crucibles onto a carrier platform inside a microwave cavity of a microwave temperature-controlled heating furnace;
    (3) vacuumizing the microwave cavity via a vacuum extract opening before heating; and
    (4) loading microwave energy to heat the raw materials by using a microwave source generator to heat each single crucible of the array of crucibles to reach a designed temperature, so as to sinter and melt the sample materials or carry out heat treatment in gradient temperature fields or same temperature fields;
    wherein adjacent single crucibles of the array crucibles are either made of materials which can absorb a gradient changing microwave energy, or made of materials which can absorb an identical microwave energy.

2. The method of claim 1, wherein the method comprises a high throughput sintering-melting preparation of metal materials in different temperature gradient fields or the same temperature field in one-time, and comprising the following steps:
    (1) preparing the raw materials, forming the raw materials into material powders, mixing material powders by weighing a series of matrix material powder of stipulated mass and a powder of to-be-added elements or components, then mixing them uniformly according to a certain design proportional ratio to prepare a series of powder mixtures with different component combinations;
    (2) placing the series of powder mixtures with different component combinations into a honeycomb-shape array crucible, and then placing the honeycomb array crucible onto the carrier platform in the microwave cavity of the microwave temperature-controlled heating furnace;
    (3) vacuumizing the microwave cavity via a vacuum extract opening before heating;
    (4) loading microwave energy to heat powder materials by using the microwave source generator to heat each single sinter crucible in the honeycomb array crucible to reach a design temperature, so as to sinter and melt the powder mixtures in a gradient temperature field or in a same temperature field;
    wherein adjacent single sinter crucibles in the honeycomb array crucible are made of either materials which can absorb the gradient changing microwave energy, or materials which can absorb the identical microwave energy.

3. The method of claim 2, wherein, in step (1), the particle size of the matrix material powder and the powder of the to-be-added elements or components is 1 nm-100 μm.

4. The method of claim 2, wherein, in step (2), the honeycomb array crucible comprises a body of honeycomb array made of materials penetrable by microwave and plural single sinter crucibles arranged in the body of honeycomb array, single sinter crucibles are in a cell shape, and the plural single sinter crucibles are arranged in the shape of hexagon honeycomb array and adjacent to each other without contacting.

5. The method of claim 2, wherein, in step (3), the vacuum pressure is 0.01-1 Pa.

6. The method of claim 2, wherein, in step (3), protective air is filled into the microwave cavity through an inlet of protective air after vacuumizing the microwave cavity in order to protect the microwave cavity under equilibrium protective air before being heated by microwave energy.

7. The method of claim 6, wherein the protective air is selected from one of helium, neon, argon, krypton, xenon and nitrogen.

8. The method of claim 2, wherein, in step (4), firstly, a low-power microwave energy of 0-500 W is applied for 5±2 minutes via the microwave source generator, so the honeycomb array crucible and the powder mixture can be heated up moderately by fully absorbing the microwave energy; secondly, a medium-power microwave energy of 501-2000 W is applied for 10±2 minutes in order to accelerate the absorption of microwave energy and heat-up of the honeycomb array crucible and the powder mixture; thirdly, a high-power microwave energy over 2000 W is applied for 30±2 minutes in order to heat the powder mixture into molten state moderately.

9. The method of claim 1, wherein the method comprises high throughput heat treatment of materials in different temperature gradient fields in one-time, and it comprises the following steps:
  (1) preparing the raw materials, forming the raw materials into flaky material samples of uniform components or different components arranged discretely;
  (2) placing the flaky material samples inside single heat treatment crucibles in a high throughput gradient heat treatment array crucible, and then placing the high throughput gradient heat treatment array crucible onto the carrier platform inside the microwave cavity of the microwave temperature-controlled heating furnace;
  (3) vacuumizing the microwave cavity via a vacuum extract opening, then vacuumizing an upper cover of a heat treatment array via an upper cover extract opening and a body of heat treatment array via an extract opening of a heat treatment array body, respectively;
  (4) loading microwave energy to heat flaky material samples to enable crucibles of the high throughput gradient heat treatment array to form a stable temperature gradient field which is kept for a certain period for heat treatment until the flaky material samples form different metallographic microstructures in different temperature regions;
  wherein each adjacent single heat treatment crucible in the high throughput gradient heat treatment array crucible comprises materials which can gradiently absorb the microwave energy.

10. The method of claim 9, wherein, in step (1), the size of the flaky material samples conforms to the size of the single heat treatment crucible in the high throughput gradient heat treatment array crucible; and the thickness of the flaky material samples is 1-5 mm.

11. The method of claim 9, wherein, in step (2), the high throughput gradient heat treatment array crucible comprises the upper cover of heat treatment array and the body of heat treatment array, which are all made of microwave-penetrable and thermal insulation materials; there are plural single heat treatment crucibles arranged in the body of heat treatment array, these single heat treatment crucibles are arranged adjacently with each other without contact, in the shape of square; protruding ends, which correspond with the single heat treatment crucibles one-to-one, are embedded on a bottom surface of the upper cover of heat treatment array, the size of the protruding ends coincides with the single heat treatment crucibles so that the protruding ends can be entirely inserted into the single heat treatment crucibles, to enable the flaky material samples to be airtight inside the single heat treatment crucibles when the upper cover of heat treatment array covers the body of heat treatment array; plural single heat treatment crucibles and plural protruding ends of the upper cover of heat treatment array are made of different materials of which can gradiently absorb microwave energy, and one single heat treatment crucible in the body of heat treatment array and its corresponding protruding ends in the upper cover of heat treatment array are made of the same materials of which the abilities to absorb the microwave energy are identical.

12. The method of claim 9, wherein, in step (3), the vacuum pressure is 0.01-1 Pa.

13. The method of claim 9, wherein, in step (4), a high-power microwave energy greater than 2000 W is directly applied by the microwave source generator for 10±2 minutes; then, keep the certain temperature for required time according to different materials after the temperature of high throughput gradient heat treatment array crucible reaches equilibrium degree, switch off the microwave source generator, control cooling air filled into an upper cover of the heat treatment array and the body of the heat treatment array with a certain flow rate which depends on a required different cooling rate of material, so as to control the cooling rate of the single heat treatment crucibles and protruding ends.

* * * * *